United States Patent

Burke

[15] 3,703,826
[45] Nov. 28, 1972

[54] BRAKE TESTING TOOL
[72] Inventor: Francis T. Burke, 590 Garnet Street, North Babylon, N.Y.
[22] Filed: Jan. 27, 1971
[21] Appl. No.: 110,120

[52] U.S. Cl. ...................73/121, 73/127, 33/179, 33/180 AT
[51] Int. Cl. .................................G01l 5/28
[58] Field of Search..........73/130, 121, 126, 127, 39, 73/141 A, 141 AB, 128, 9, 135, 133; 33/179, 180 AT, 181 AT

[56] References Cited

UNITED STATES PATENTS

| | | |
|---|---|---|
| 2,625,818 | 1/1953 | Pederson.....................73/121 |
| 2,251,615 | 8/1941 | Miehle........................73/135 |
| 2,063,244 | 12/1936 | Gulliver |

*Primary Examiner*—Richard C. Queisser
*Assistant Examiner*—Marvin Smollar
*Attorney*—James P. Malone

[57] ABSTRACT

A steel band is adapted to be clamped on vehicle brake shoes when the brake drum has been removed for the purpose of testing the operation of the brakes. One end of the steel band is clamped with a clamp in a holding member, and the other end of the steel band is connected to the holding member with a calibrated spring scale. If the band is clamped in place on the brake shoes, when the brakes operate, the force exerted by the shoes may be read on the scale.

2 Claims, 3 Drawing Figures

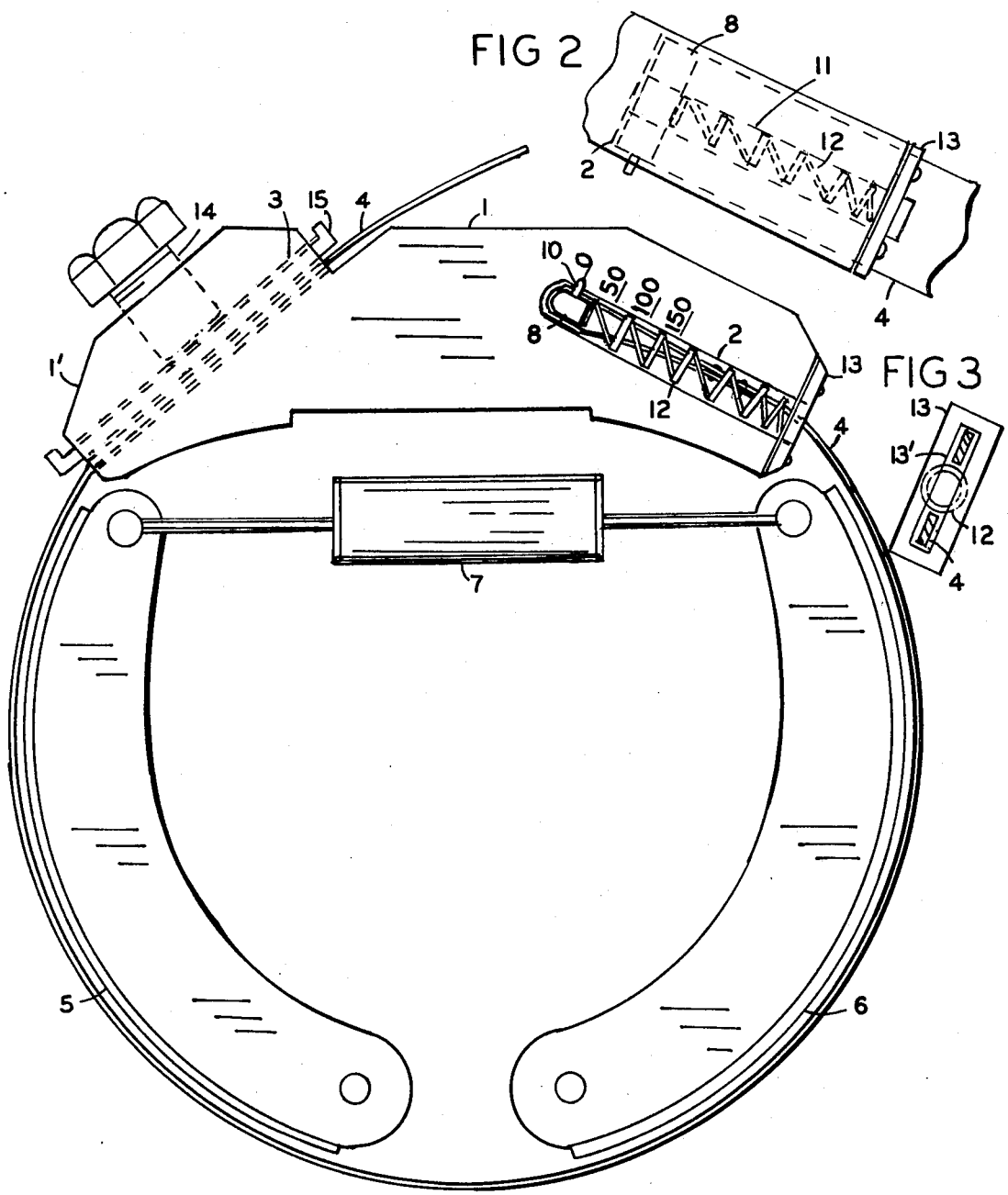

BRAKE TESTING TOOL

This invention relates to brake testing means and, more particularly, to a steel band which is adapted to be clamped on brake shoes to simulate a brake drum.

In inspecting and repairing vehicle brake systems, it is difficult to check the operation of the brake shoes and hydraulic cylinder, since they are covered by the brake drum. When the brake drum is removed, they cannot be operated with any pressure, as there is nothing to restrain them.

The present invention comprises a steel band which is adapted to be clamped onto the brake shoes to simulate the brake drum. Once the band is clamped in place, the brakes may be operated normally, and the shoes will expand against the band of the present invention. A spring scale is incorporated so that the brake force may be measured. This permits easy visual inspection, under pressure, of the hydraulic system, including the brake cylinder, connecting lines, and the master cylinder, as well as the mechanical throw and braking force on each wheel. If there is any leakage under pressure, it can be easily seen.

It is also possible to measure and adjust the throw of the brake shoes and to measure the force exerted by the brake shoes.

Accordingly, a principal object of the invention is to provide new and improved vehicle brake testing means.

Another object of the invention is to provide new and improved vehicle brake testing means which simulate a brake drum so that the brake system may be operated under normal conditions and visually inspected at the same time.

Another object of the invention is to provide new and improved means to measure the braking force.

Another object of the invention is to provide new and improved vehicle brake testing means comprising a holding member, a first slot in the other end of said holding member, a band member, spring means to connect one end of said band member in said first slot and clamp means to clamp said band member in said second slot, whereby said band may be clamped on brake shoes to simulate a brake drum.

These and other objects of the invention will be apparent from the following specification and drawings, of which:

FIG. 1 is a side view of the embodiment of the invention.

FIG. 2 is a detail view.

FIG. 3 is a detail view.

Referring to the figures, the invention generally comprises a holding member 1, which may be a cast or machined block of metal which has a slot 2 which extends completely through the block at one end and a second slot 3 at the other end.

A band member 4 which may, for instance, be a 1½ inches flexible steel band, is mounted in the holding member so that it may be clamped onto brake shoes 5 and 6, which are adapted to be operated by the hydraulic cylinder 7.

One end of the brake band is folded and riveted around an indicator bar 8, which has a pointer 10. The folded end of the band has a slot 11 to accommodate spring 12. The spring 12 is connected to the bar 8 at one end and is held inside the slot 2 by means of the cover plate 13, which is secured to the block 1 by means of screws. The cover plate 13 has a slot 13' through which the band 4 extends.

A scale, for instance, reading 0 lbs., 50 lbs., 100 lbs., 150 lbs. is printed or engraved on the side face of the member 1 so that the amount of force of the pulling of the band 4 can be measured. The spring 12 is preferably a 150 lb. spring.

At the other end of the holding member 1 is mounted a slot 3 through which the free end of the band 4 may be inserted. The band is inserted in the slot 3 and drawn up tight against the brake shoes by hand pressure and is then clamped in position by means of the clamping screw 14, which is threadedly mounted in the extension 1' of the member 1, and which bears against a clamping shoe 15. Once the band 4 has been placed on the brake shoes 5 and 6 and is tightened and clamped, then the brake pedal may be operated in normal manner and the operation of the brakes inspected visually, and the brakes may be adjusted as required. At the same time, the hydraulic system may be checked for leakage or any other defect under operating conditions.

This device saves a great deal of time doing brake jobs as it is not necessary to re-install the brake drums in order to check out the operation of the brake shoes and hydraulic systems. In conventional practice, the brake shoes may have to be installed and removed and re-installed several times if there is any trouble developed in the system.

Therefore, the present invention provides a brake testing tool which is adapted to simulate a brake drum and permit normal operation of the brake system for the purpose of visual inspection and adjustment. At the same time, the braking force may be measured on a calibrated scale. If all four wheels are equipped with the present invention, then the amount of braking force applied to each wheel may be easily measured visually, which will provide a good indication for localizing any troubles in the system.

I claim:

1. Vehicle brake testing means comprising,
   a holding member,
   a band member,
   spring means to connect one end of said band member to said holding member and clamp means to clamp the other end of said band member in said holding member,
   whereby said band may be clamped on brake shoes to simulate a brake drum,
   said spring means having an indicator connected thereto and said holding member having a calibrated scale whereby the force exerted by said brake shoes may be measured visually.

2. Apparatus as in claim 1 having first and second slots in said holding member, said spring means being mounted in said first slot and said clamp means being mounted in said second slot.

* * * * *